Figure 1:
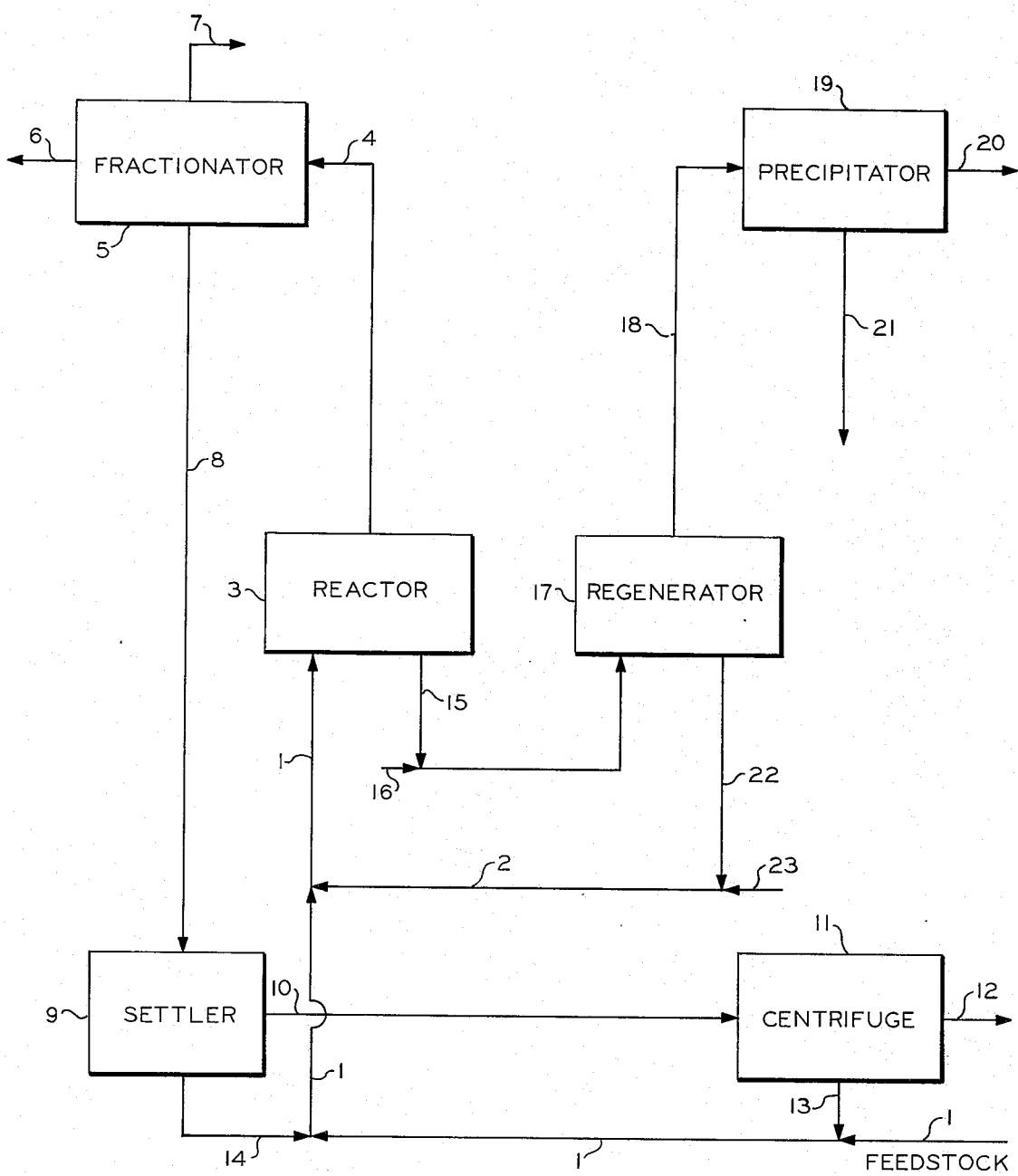

United States Patent [19]

Anthoney

[11] 3,904,509
[45] Sept. 9, 1975

[54] RECOVERY OF LOW ASH CONTENT OIL FROM KETTLE RESIDUE FRACTION OF CATALYTICALLY CONVERTED HYDROCARBON OIL

[75] Inventor: William R. Anthoney, Concord, Calif.

[73] Assignee: Phillips Petroleum Company, Bartlesville, Okla.

[22] Filed: Sept. 4, 1974

[21] Appl. No.: 503,092

[52] U.S. Cl. ............... 208/113; 208/120; 208/162; 208/177
[51] Int. Cl. .......................... C10g 11/02; B01j 9/20
[58] Field of Search ........... 208/113, 120, 162, 177

[56] References Cited
UNITED STATES PATENTS

| | | |
|---|---|---|
| 2,501,436 | 3/1950 | Cleveland et al. .................. 208/152 |
| 2,862,876 | 12/1958 | Winberg ............................ 208/187 |
| 2,899,373 | 8/1959 | Steeves ................................ 208/39 |
| 2,998,467 | 8/1961 | Gilbert .......................... 260/683.75 |
| 3,042,196 | 7/1962 | Payton et al. ....................... 208/113 |
| 3,247,096 | 4/1966 | Conwell .............................. 208/96 |
| 3,849,294 | 11/1974 | Hansen ............................. 208/162 |

Primary Examiner—Delbert E. Gantz
Assistant Examiner—G. E. Schmitkons

[57] ABSTRACT

The kettle residue oil containing entrained catalyst from the fractionation of catalytically converted hydrocarbon oil is passed through a settler and then centrifuged to produce an oil of suitably low ash content. The catalyst from the settler and the catalyst fines from the centrifugation are recycled to the reactor thereby eliminating the disposal of an oily catalyst residue. In one embodiment of the invention, an oil of suitably low ash content to serve as a carbon black production feedstock is produced.

3 Claims, 1 Drawing Figure

//3,904,509

RECOVERY OF LOW ASH CONTENT OIL FROM KETTLE RESIDUE FRACTION OF CATALYTICALLY CONVERTED HYDROCARBON OIL

BACKGROUND OF THE INVENTION

This invention relates to catalytic conversion of hydrocarbon oils. In one of its aspects, the invention relates to the recovery of a low ash content oil from the kettle residue oil remaining in the fractionation of a catalytically converted hydrocarbon oil. In another of its aspects, this invention relates to the separation of catalyst from a kettle residue oil left in the fractionation of a catalytically converted hydrocarbon oil. In still another of its aspects, this invention relates to the recycling through the catalytic reaction of an oily catalyst residue separated from the kettle residue oil produced in the fractionation of a catalytically converted hydrocarbon oil.

In one of its concepts, this invention relates to the separation of the kettle residue oil remaining from the fractionation of catalytically converted hydrocarbon oil into an oil product of sufficiently low ash content to be suitable as a commercial product and to an oily catalyst residue which is recycled to the catalytic reaction thereby eliminating contamination of the environment with the oily catalyst residue.

In the catalytic treatment of hydrocarbon oils to convert the feedstock oil into hydrocarbon products that are more commercially advantageous the product from the reactor is always fractionated to separate light hydrocarbons, gasolines, and various grades of cycle oil. In the fractionation process a kettle residue oil is produced in which there is entrained catalyst from the reaction. The recovery of this kettle residue fraction as a commercial product requires the separation of the catalyst from the oil. The recovered oil becomes increasingly economically advantageous as more of the catalyst is removed to produce an oil that is increasingly ash-free.

A large proportion of the catalyst can be removed from a kettle residue oil by passing this 9material into a settling vessel so that the oil is held for a time sufficient to allow the heavier particles of catalyst to settle to the bottom of the vessel from which the catalyst particles with enough of the oil to serve as the carrier can be recycled back to the reaction zone and recovered. Generally, this operation leaves a sufficient amount of fine catalyst particles suspended in the oil that additional means are necessary to perform a separation of the oil from the remaining catalyst to produce an oil of a desirably low ash content. Such a separation can be accomplished by centrifugation. Centrifugation, however, produces an oily catalyst residue which up to now has been discarded from the system to become an environmental pollutant when it is buried or otherwise disposed of.

By the process of the present invention an integrated system is set forth in which the kettle residue oil from the fractionation of the product of the catalytic conversion of hydrocarbon oil is separated into an oil of commercially desirable low ash content and an entrained catalyst residue without disposing of the catalyst residue into the environment to become a pollutant.

Other aspects and advantages of this invention will be evident from the reading of this disclosure, the drawing, and the appended claims.

STATEMENT OF THE INVENTION

In accordance with this invention, a method is provided for producing catalytically converted oil of low ash content from the kettle residue oil produced by fractionation of a catalytically converted oil. The method entails subjecting the catalytically converted oil from a catalytic conversion reaction of hydrocarbons to fractionation so that a residue oil fraction containing catalyst entrained from the reaction is produced. The residue oil fraction is allowed to settle so that there is produced a major portion of the residue oil fraction from which the majority of catalyst is settled, generally leaving only suspended fines material, and also producing a minor portion of the residue oil fraction containing settled catalyst. The major portion of the residue fraction is centrifuged to produce an oil of low ash content and an oily catalyst residue. The oil of low ash content is recovered and the oily catalyst residue is recycled from the centrifuge to the reaction along with the heavy oil fraction containing settled catalyst which is recycled from the settler.

The invention can best be understood in conjunction with the drawing which is a schematic representation of the process of this invention.

Referring now to the drawing, a hydrocarbon oil feed is passed through line 1 with a controlled amount of catalyst from line 2 into a reactor 3 at conditions sufficient to catalytically convert the hydrocarbon feedstock into more commercially desirable products, i.e., the cracking of topped crude and/or gas oils boiling higher than gasolines into hydrocarbons within the gasoline range. The reactor effluent is moved through line 4 to a fractionator 5 where desirable fractions of the distillation are removed through lines 6 and 7 leaving a kettle residue oil containing entrained catalyst from the reaction to be removed through line 8.

The kettle residue oil containing entrained catalyst is transferred through line 8 into a settling vessel 9 which is of sufficient capacity to permit the majority of the entrained catalyst to settle so that the majority of the kettle residue oil containing only suspended catalyst fines can be transferred through line 10 to a centrifuge 11 from which kettle residue oil with a minimum ash content can be removed through line 12 and the oily catalyst residue can be removed through line 13.

Both the oily catalyst residue removed through line 13 from the centrifuge and the settled catalyst with a minimum amount of carrier oil which can be removed from the settler through line 14 are mixed with feestock in line 1 and thus recycled to the reactor.

There is no buildup of catalyst fines in the system. Although the exact mechanism is not known, it is believed that the catalyst fines particles are agglomerated in the centrifuge and that upon being returned to the reactor system the agglomerated particles are retained in the reactor until passed through line 15 along with regeneration and carrier gas such as air in line 16 to regenerator 17. In the regeneration the agglomerated particles are again reduced to fines which are sufficiently small to pass out of the regenerator through line 18 into an electrostatic precipitator 19 through which the flue gas passes in line 20 while the solid particles are collected and disposed of through line 21 as dry solids. Although some catalyst fines may be returned from the regenerator through line 22 and find their way with makeup catalyst and a carrier such as steam from line 23 back through lines 2 and 1 into the reactor, the amount is evidently insufficient to cause a buildup of fines in the system.

In a specific example of a cracking process as shown in U.S. Pat. No. 3,042,196 using the improved process of this invention, a fractionator kettle residue oil 8 in an amount of about 2200 barrels per day and containing about 10,000 parts per million by weight of entrained catalyst was passed to a settler 9 having a capacity of about 1000 barrels. After being allowed to settle, oil 10 containing catalyst fines having a maximum size of approximately 2 microns or less and ranging from about 2000 to 3000 parts per million in concentration, was passed at a rate of about 2000 barrels per day through a Dorr-Oliver centrifuge 11. The underflow 13 from the centrifuge which amounts to about 10 to 15 percent of the material charged, about 200 barrels per day, and which contains at least 90 percent of the catalyst fines charged to the centrifuge in the decanted oil 10 is recovered and passed with dilution feedstock 1 back to the reactor 3. The overflow 12 from the centrifuge amounting to 85 to 90 percent of the centrifuge charge, about 1800 barrels per day, and containing less than 10 percent of the original catalyst fines charged to the centrifuge was recovered and tested as containing about 100 parts per million ash which is of a sufficient quality to serve as low ash carbon black feedstock or as low ash fuel oil. Settler underflow 14 is also reinjected to reactor 3 by means of feedstock 1 in a volume of about 200 barrels per day.

With both the catalyst fines in the centrifuge underflow and settled catalyst from the settler being returned to the reactor the average catalyst loading of the feedstock-catalyst slurry to the reactor for 2 weeks following startup of the centrifuge system was 0.05 pound catalyst per gallon of slurry. Comparing this to the average catalyst loading of the same slurry for 2 weeks prior to the centrifuge startup, i.e., without return of the centrifuged catalyst fines to the reactor, the average catalyst loading was 0.05 pound of catalyst per gallon of slurry, which showing the same average indicates no buildup of catalyst fines in the reactor slurry system by return of the fines material to the reactor.

Reasonable variation and modification are possible within the scope of the foregoing disclosure, the drawing, and the appended claims to the invention, the essence of which is that there has been provided a method for operating a hydrocarbon oil cracking and recovery system in which the recovery of fractionator kettle residue oil as useful commercial product is maximized without contamination of the environment or disruption of the reaction-recovery system by a two-stage separation of entrained catalyst from the fractionator kettle residue oil, the separation 7with return of the separated catalyst to the reaction system and recovery of low ash, commercial quality catalytically reacted oil product.

I claim:

1. A method for producing catalytically converted oil of low ash content, said method comprising:
   1. subjecting catalytically converted oil from a catalytic conversion reaction of hydrocarbon oil to fractionation thereby producing a residue oil fraction containing catalyst entrained from the reaction,
   2. allowing the catalyst in said residue oil fraction to settle thereby producing a major portion of said residue oil fraction from which the majority of catalyst has settled and a minor portion of said residue oil fraction containing settled catalyst,
   3. centrifuging the major portion of said residue oil fraction to produce (a) an oil of low ash content and (b) and oily catalyst residue,
   4. recycling to the reaction said oily catalyst residue,
   5. recovering said oil of low ash content, and
   6. recycling to the reaction the minor portion of said heavy oil fraction.

2. The method of claim 1 wherein the oily catalyst residue and minor portion of said residue oil fraction are mixed with catalytic conversion reaction hydrocarbon feedstock before being recycled to the reactor.

3. The method of claim 1 wherein said oil of low ash content is of sufficiently low ash content to serve as carbon black production feedstock.

* * * * *